United States Patent [19]

Sugimoto

[11] Patent Number: 4,645,435

[45] Date of Patent: Feb. 24, 1987

[54] ROTATION PREVENTING DEVICE FOR AN ORBITING MEMBER OF A FLUID DISPLACEMENT APPARATUS

[75] Inventor: Kazuo Sugimoto, Gunma, Japan

[73] Assignee: Sanden Corporation, Gunma, Japan

[21] Appl. No.: 854,702

[22] Filed: Apr. 23, 1986

Related U.S. Application Data

[63] Continuation of Ser. No. 672,829, Nov. 19, 1984, abandoned.

[30] Foreign Application Priority Data

Nov. 19, 1983 [JP] Japan ................................ 58-217108

[51] Int. Cl.[4] .......................... F01C 1/04; F01C 21/02; F16C 19/16; F16D 3/04
[52] U.S. Cl. .................................... 418/55; 384/614; 464/103
[58] Field of Search .................... 418/55, 57; 384/523, 384/529, 530, 614; 464/103

[56] References Cited

U.S. PATENT DOCUMENTS

| | | |
|---|---|---|
| 801,182 | 10/1905 | Creux . |
| 847,069 | 3/1907 | Hawkins . |
| 1,907,447 | 5/1933 | Schiltz . |
| 2,072,515 | 3/1937 | Delaval-Crow ................... 384/614 |
| 2,883,244 | 4/1959 | Berger ................................ 384/523 |
| 4,160,629 | 7/1979 | Hidden et al. ...................... 418/55 |
| 4,259,043 | 3/1981 | Hidden et al. ...................... 418/55 |
| 4,468,181 | 8/1984 | Sakamoto ........................... 418/55 |

FOREIGN PATENT DOCUMENTS

| | | |
|---|---|---|
| 17886 | 6/1934 | Australia . |
| 1960216 | 12/1969 | Fed. Rep. of Germany . |
| 928465 | 12/1947 | France . |
| 976187 | 10/1950 | France . |

Primary Examiner—John J. Vrablik
Attorney, Agent, or Firm—Banner, Birch, McKie & Beckett

[57] ABSTRACT

A rotation preventing/thrust bearing device for a scroll type fluid displacement apparatus is disclosed. The rotation preventing/thrust bearing device includes a fixed portion, an orbital portion and balls. The fixed and orbital portions each include an annular race and a ring which covers the end surface of the race. Both rings have a plurality of holes or pockets in an axial direction. The balls are placed between the facing holes in the ring, and are in contact with both races to carry the thrust load from the orbiting scroll member. All balls are rotatably held on a retainer which is disposed in an axial clearance between the facing rings.

3 Claims, 6 Drawing Figures

ROTATION PREVENTING DEVICE FOR AN ORBITING MEMBER OF A FLUID DISPLACEMENT APPARATUS

This application is a continuation of application Ser. No. 672,829, filed Nov. 19, 1984, abandoned.

TECHNICAL FIELD

This invention relates to a scroll type fluid displacement apparatus, and more particularly, to an improvement in the rotation preventing/thrust bearing mechanism in scroll type fluid displacement apparatus.

BACKGROUND OF THE INVENTION

Scroll type fluid displacement apparatus are well known in the prior art. For example, U.S. Pat. No. 801,182 issued to Creux discloses a basic construction of a scroll type fluid displacement apparatus which includes a pair of scrolls, each having a circular end plate, and a spiroidal or involute spiral element affixed to or extending from one axial end surface of each circular end plate. These scrolls are maintained angularly and radially offset so that both spiral elements interfit and make a plurality of line contacts between their spiral curved surfaces to thereby seal off and define at least one pair of fluid pockets. The relative orbital motion of the two scrolls shifts the line contacts along the spiral curved surfaces and, as a result, the volume of the fluid pockets changes. Since the volume of fluid pockets increases or decreases, dependent on the direction of the orbital motion, the scroll type fluid displacement apparatus is applicable to compress, expand or pump fluids.

Generally, in conventional scroll type fluid displacement apparatus where the orbiting scroll is supported on a crank pin in a cantilever manner, axial slant occurs. Axial slant also occurs because the movement of the orbiting scroll is not rotary motion around the center of the orbiting scroll, but is orbital motion caused by the eccentric movement of a crank pin driven by a drive shaft. Several problems result because of this axial slant including improper sealing of line contacts, vibration of the apparatus during operation and noise caused by the physical striking of the spiral elements. One simple and direct solution to these problems is the use of a thrust bearing device for carrying the axial loads. Thus, scroll type fluid displacement apparatus usually have a thrust bearing device within its housing.

Referring to FIGS. 1, 2 and 3, one recent attempt to improve a rotation preventing and thrust bearing device in scroll type fluid displacement apparatus is illustrated. FIG. 1 is a vertical sectional view of a part of a compressor; FIG. 2 is an exploded perspective view of a rotation preventing/thrust bearing device; and FIG. 3 is a diagrammatic front view of the rotation preventing/thrust bearing device, illustrating the manner in which rotation is prevented.

A rotation preventing/thrust bearing device 37' surrounds a boss 273' of orbiting scroll 27' and includes an orbital portion, a fixed portion and bearings, such as a plurality of balls. The fixed portion includes (1) an annular fixed race 371' having one end surface fitted against an axial end surface of an annular projection 112' of a front end plate 11', and (2) a fixed ring 372' fitted against the other axial end surface of fixed race 371' to extend outwardly therefrom and cover the other end surface of fixed race 371'. Fixed race 371' and ring 372' are attached to the axial end surface of annular projection 112' by pins 373'. The orbital portion also includes (1) an annular orbital race 374', which has one end surface fitted against an axial end surface of a circular end plate 271', and (2) an orbital ring 375' fitted against the other axial end surface of orbital race 374' to extend outwardly therefrom and cover the other axial end surface of orbital race 374'. A small axial clearance is maintained between the end surface of fixed ring 372' and the end surface of orbital ring 375'. Orbital race 374' and ring 375' are attached to the end surface of circular end plate 271' by pins 376'.

Fixed ring 372' and orbital ring 375' each have a plurality of holes or pockets 372a' and 375a' in the axial direction, with the number of holes or pockets in each ring 372' and 375' being equal. The holes or pockets in each ring 372' and 375' being equal. The holes or pockets 372a' of fixed ring 372' correspond to or are a mirror image of the holes or pockets 375a' on orbital ring 375', i.e., each pair of pockets facing each other have the same size and pitch, and the radial distance of pockets from the center of their respective rings 372' and 375' is the same, i.e., the centers of pockets are located at the same distance from the center of rings 372' and 375'. Thus, if the center of the rings 372' and 375' were aligned, which they are not in actual operation of the rotation preventing/thrust bearing means 37', the holes or pockets 372a' and 375a' would be identical or in alignment. Bearing elements, such as balls 377' are placed between facing or generally aligned pair of pockets 372a' and 375a' of fixed and orbital rings 372' and 375'.

In this arrangement, if the orbiting scroll is driven by the rotation of the drive shaft in the direction indicated by arrow A in FIG. 3, the center of orbital ring 375' orbits about a circle of radius Ror (together with orbiting scroll 27'). However, a rotating force, i.e., moment, which is caused by the offset of the acting point of the reaction force of compression and the acting point of the drive force, acts on orbiting scroll 27'. This reaction force tends to rotate the orbiting scroll 27 in the clockwise direction about the center of orbital ring 375'. In the embodiment as shown in FIG. 3, eighteen balls 377' are placed between the pockets 372a', 375a'. In the positions shown in FIG. 3, the interaction between the nine balls 377' in the top half of the rotation preventing/thrust bearing device and the edges of pockets 372a', 375a' prevents the rotation of orbiting scroll 27'. The magnitude of rotation preventing forces for the top half of the rotation preventing/thrust bearing device are shown by force vectors $fc_1$–$fc_5$. In any given position of orbiting scroll 27' and orbital ring 375' about the orbital radius Ror, only half the balls 377' and pockets 372a', 375a' function to prevent rotation of the orbiting scroll 27', and to varying degrees as illustrated by the magnitude of force vectors $fc_1$–$fc_5$; however, all the balls carry the axial thrust load from orbiting scroll 27'. Therefore, this rotation preventing/thrust bearing device includes a large number of balls, which is desirable for carrying the thrust load from the orbiting scroll. However, in the assembly process of the compressor, each of the balls must be placed in each pocket and between the edges of facing pockets. Thus, assembly of the compressor can be complicated and time consuming.

SUMMARY OF THE INVENTION

It is a primary object of this invention to provide an improved rotation preventing/thrust bearing device for a scroll type fluid displacement apparatus.

It is another object of this invention to provide a rotation preventing/thrust bearing device for a scroll type fluid displacement apparatus wherein assembly is simplified and time efficient.

It is a further object of this invention to provide a rotation preventing/thrust bearing device for a scroll type fluid displacement apparatus which is light in weight and simple in construction.

A scroll type fluid displacement apparatus according to this invention includes a housing. A fixed scroll is fixedly disposed within the housing and has a circular end plate from which a first wrap extends. An orbiting scroll has a circular end plate from which a second wrap extends. The first and second wraps interfit at an angular and radial offset to make a plurality of line contacts which define at least one pair of sealed off fluid pockets. A driving mechanism is operatively connected to the orbiting scroll to effect its orbital motion. A rotation preventing/thrust bearing device is connected to the orbiting scroll for preventing the rotation of orbiting scroll during the orbital motion so that the fluid pockets change volume during the orbital motion of the orbiting scroll.

The rotation preventing/thrust bearing device includes a fixed ring attached on an inner surface of the housing, an orbital ring attached on one axial end surface of the circular end plate of the orbiting scroll with a small axial clearance between the fixed and orbital rings and a plurality of balls. The orbital and fixed rings each have a plurality of pockets, with the number of pockets in each ring being equal. The balls are placed between each pair of facing pockets; and all balls are rotatably held by a retainer.

Further objects, features and other aspects of this invention will be understood from the following detailed description of the preferred embodiment of this invention referring to the annexed drawings.

DETAILED DESCRIPTION OF THE PREFERRED EMBODIMENT

Figure 1:
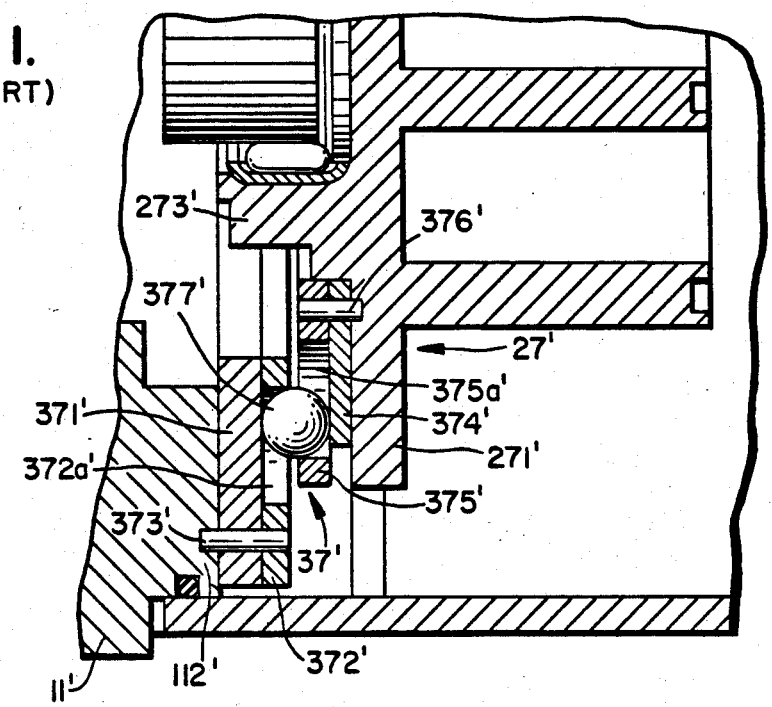
FIG. 1 is a vertical sectional view of a part of a compressor, illustrating a prior art construction of a rotation preventing/thrust bearing device.
Figure 3:
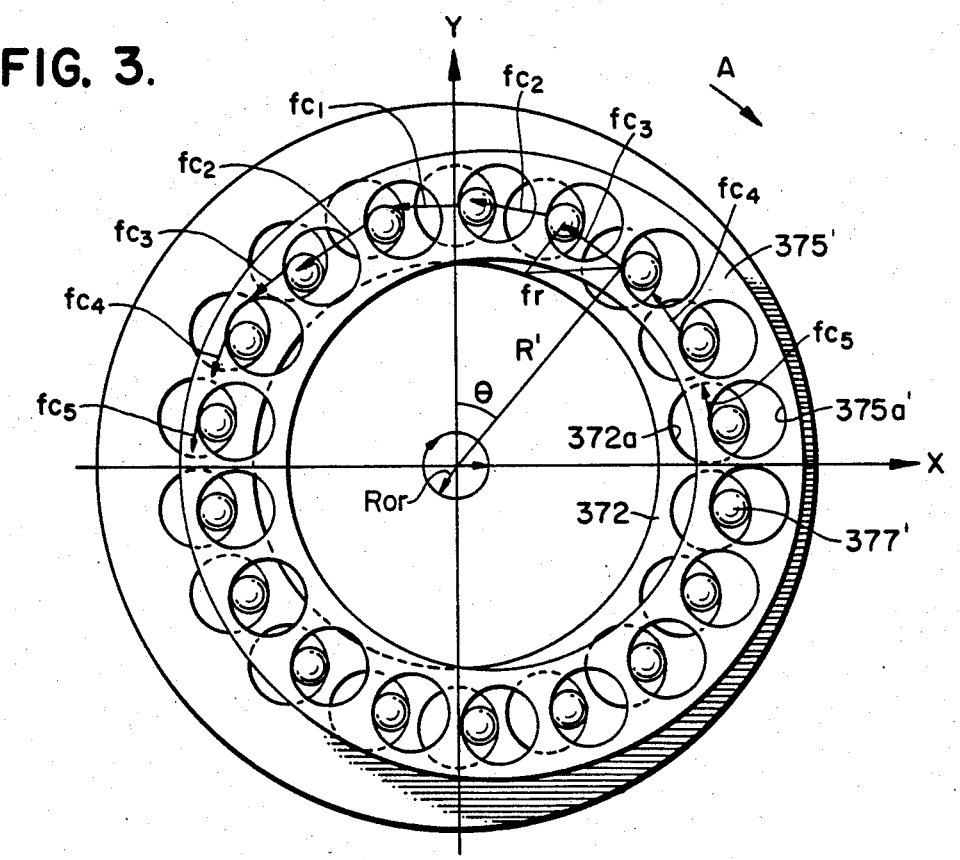
FIG. 3 is a diagrammatic front view of the rotation preventing/thrust bearing device shown in FIG. 1, illustrating the manner by which rotation is prevented.
Figure 2:
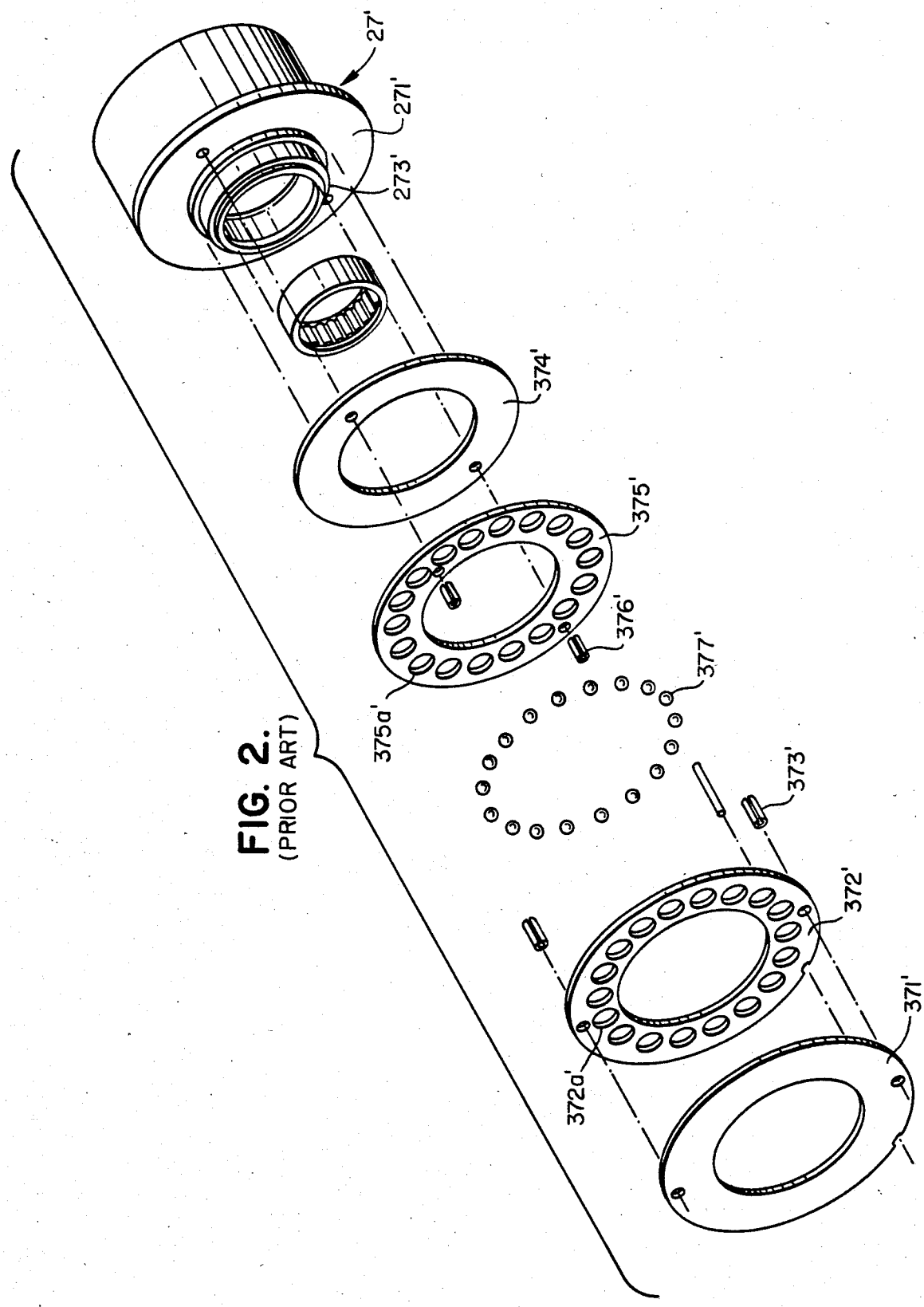
FIG. 2 is an exploded perspective view of the rotation preventing/thrust bearing device shown in FIG. 1.
Figure 4:
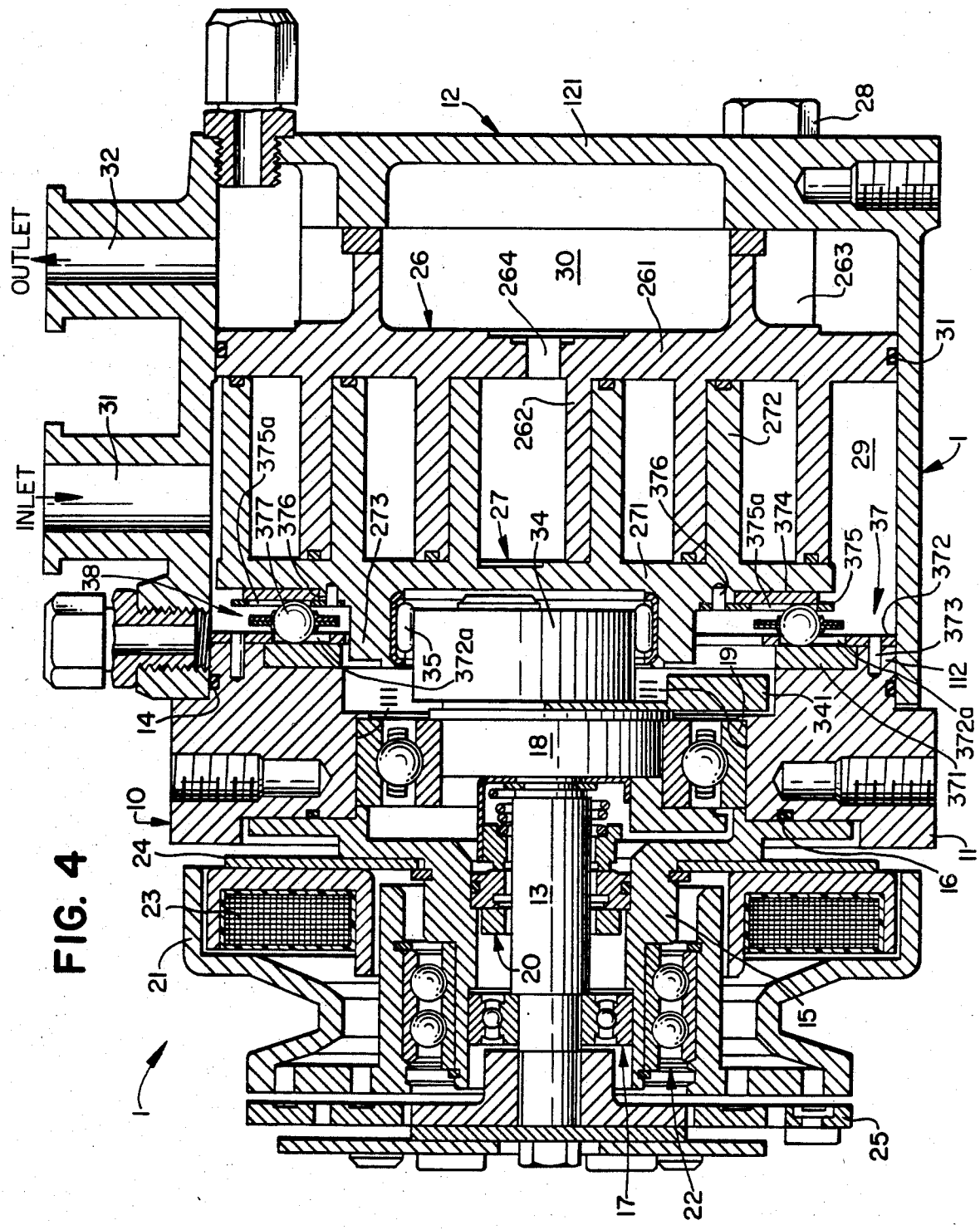
FIG. 4 is a vertical sectional view of a compressor unit according to one embodiment of this invention.

Referring to FIG. 4, a scroll type fluid displacement apparatus in accordance with the present invention is shown in the form of scroll type refrigerant compressor unit 1. Compressor unit 1 includes a housing 10 having a front end plate 11 and cup shaped casing 12 which is attached to an end surface of front end plate 11. An opening 111 is formed in the center of front end plate 11 for the penetration or passage of drive shaft 13. An annular projection 112 is formed in the rear end surface of front end plate 11 which faces cup shaped casing 12 and is concentric with opening 111. An outer peripheral surface of annular projection 112 extends into an inner wall of the opening of cup shaped casing 12. Thus, the opening of cup shaped casing 12 is covered by front end plate 11. An O-ring 14 is placed between the outer peripheral surface of annular projection 112 and the inner wall of the opening of cup shaped casing 12 to seal the mating surfaces of front end plate 11 and cup shaped casing 12.

Front end plate 11 has an annular sleeve 15 projecting from the front end surface thereof which surrounds a drive shaft seal cavity. In the embodiment shown in FIG. 4, sleeve 15 is formed separately from front end plate 11, and is attached to the front end surface of front end plate 11 by screws (not shown). An O-ring 16 is placed between the end surface of front end plate 11 and an end surface of sleeve 15 to seal the mating surfaces of front end plate 11 and sleeve 15. Alternatively, sleeve 15 may be formed integral with front end plate 11.

Drive shaft 13 is rotatably supported by sleeve 15 through a bearing 17 located near the front end of sleeve 15. Drive shaft 13 has a disk portion 18 at its inner end portion which is rotatably supported by front end plate 11 through a bearing 19 located within opening 111. A shaft seal assembly 20 is coupled to drive shaft 13 within the shaft seal cavity of sleeve 15.

A pulley 21 is rotatably supported by a bearing 22 which is carried on the outer surface of sleeve 15. An electromagnetic coil 23 is fixed about the outer surface of sleeve 15 by a support plate 24 and is received in an annular cavity of pulley 21. An armature plate 25 is elastically supported on the outer end of drive shaft 13 which extends from sleeve 15. Pulley 21, magnetic coil 23 and armature plate 25 form a magnetic clutch. In operation, drive shaft 13 is driven by an external power source, for example the engine of an automobile, through a rotation force transmitting device, such as the above-mentioned magnetic clutch.

A number of elements are located within the inner chamber of cup shaped casing 12 including a fixed scroll 26, an orbiting scroll 27, a driving mechanism for orbiting scroll 27 and a rotation preventing/thrust bearing device 37 for orbiting scroll 27. The inner chamber of cup shaped casing 12 is formed between the inner wall of cup shaped casing 12 and the rear end surface of front end plate 11.

Fixed scroll 26 includes a circular end plate 261, a wrap or spiral element 262 affixed to or extending from one end surface of end plate 261 and a plurality of internally threaded bosses 263 axially projecting from the other end surface of circular end plate 261. Fixed scroll 26 is secured within the inner chamber of cup shaped casing 12 by screws 28 which screw into internally threaded bosses 263 from outside of cup shaped casing 12. Circular end plate 261 of fixed scroll 26 partitions the inner chamber of cup shaped casing 12 into two chambers, such as a front chamber 29 and a rear chamber 30. A seal ring 31 is disposed within a circumferential groove in circular end plate 261 to form a seal between the inner wall of cup shaped casing 12 and the outer surface of circular end plate 261. A hole or discharge port 264 is formed through circular end plate 261 at a position near the center of spiral element 262.

Discharge port 264 connects the central fluid pockets of the spiral element 262 with rear chamber 30.

Orbiting scroll 27, which is located in front chamber 29 includes a circular end plate 271 and a wrap or spiral element 272 affixed to or extending from one end surface of circular end plate 272. Both spiral elements 262, 272 interfit at an angular offset of 180° and a predetermined radial offset. At least one pair of fluid pockets are thereby defined between spiral elements 262 and 272. Orbiting scroll 27 is rotatably supported by bushing 34 through bearing 35 placed between the outer peripheral surface of bushing 34 and an inner surface of an annular boss 273 axially projecting from the end surface of end plate 271. Bushing 34 is rotatably connected to an inner end of disk 18 at a point radially offset or eccentric of the axis of drive shaft 13. Also, rotation preventing/thrust bearing device 37, which is disposed around boss 273 of orbiting scroll 27, is connected to orbiting scroll 27. Therefore, orbiting scroll 27 is driven in an orbital motion at a circular radius Ror by rotation of drive shaft 13 to thereby compress fluid passing through the compressor unit. Generally, radius Ror of orbital motion is given by the following formula:

$$Ror = \frac{(\text{pitch of spiral element}) - 2(\text{wall thickness of spiral element})}{2}$$

In this arrangement, spiral element 272 of orbiting scroll 27 is radially offset from the spiral element 262 of fixed scroll 26 by the distance Ror. Thus, orbiting scroll 27 undergoes orbital motion of radius Ror upon rotation of drive shaft 13. As the orbiting scroll 26 orbits, the line contacts between spiral elements 262, 272 move toward the center of spiral elements along the spiral curved surfaces of the spiral elements. The fluid pockets, which are defined by spiral elements 262 and 272, also move to the center with consequent reduction in volume and compression of the fluid in the fluid pockets. The fluid or refrigerant gas, which is introduced into front chamber 29 from an external fluid circuit through an inlet port 31, is taken into the fluid pockets formed between spiral elements 262, 272. As orbiting scroll 27 orbits, fluid in fluid pockets is compressed and the compressed fluid is discharged into chamber 30 through discharge port 264. The fluid is then discharged to the external fluid circuit through an outlet port 32.

Rotation preventing/thrust bearing device 37 surrounds boss 273 of orbiting scroll 27 and is placed between the inner end surface of front end plate 11 and the end surface of circular end plate 271 which faces the inner end surface of front end plate 11. Rotation preventing/thrust bearing device 37 includes a fixed portion, an orbital portion and bearings, such as a plurality of balls. Fixed portion includes (1) an annular race 371 placed within an annular groove formed on the axial end surface of annular projection 112 of front end plate 11 and (2) a fixed ring 372 which is formed separately from annular race 371 and fitted against the axial end surface of annular projection 112 of front end plate 11. Fixed ring 372 is fixed on axial end surface of annular projection 112 by pins 373 and has a width to cover the end surface of fixed race 371. Orbital portion also includes (1) an annular orbital race 374 placed within an annular groove formed on end surface of end plate 271 and (2) an orbital ring 375 which is formed separately from orbital race 374 and fitted against the end surface of end plate 271. Orbital ring 375 is fixed on end plate 271 by pins 376 and has a width to cover the end surface of oribital race 374.

Fixed ring 372 and orbital ring 375 each have a plurality of holes or pockets 372a and 375a in the axial direction, with the number of holes or pockets 372a, 375a in each ring 372 and 375 being equal. Fixed ring 372 and orbital ring 375 face each other at a predetermined axial clearance. Pockets 372a of fixed ring 372 correspond in location to pockets 375a of orbiting ring 375, i.e., at least each pair of pockets facing each other have the same pitch, and the radial distance of pockets from the center of their respective rings 372 and 375 is the same. The center of each pair of pockets 372a, 375a are radially offset by an amount equal to the distance Ror. Balls 377 are placed between the edges of pockets 372a of fixed ring 372 and the edges of pockets 375a of orbital ring 375.

Figure 5:
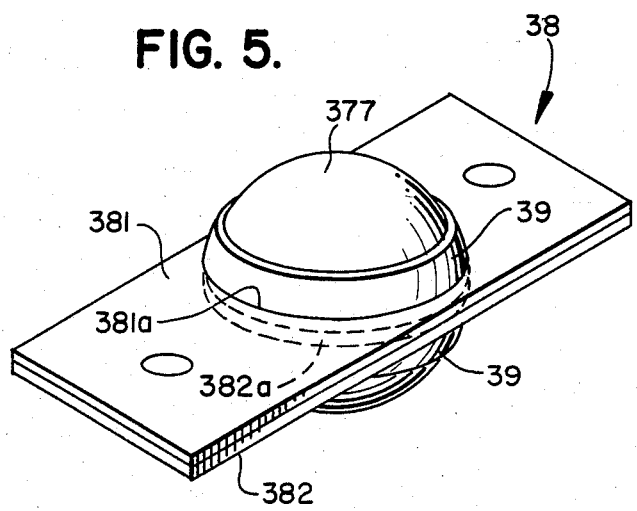
FIG. 5 is a perspective view of a ball retainer of the rotation preventing/thrust bearing device shown in FIG. 4.

In this arrangement of rotation preventing/thrust bearing device, all balls 377 are held by retainer 38 which is disposed in the axial clearance between fixed and orbital rings 372 and 375. As shown in FIGS. 4 and 5, retainer 38 comprises two annular plates 381 and 382 which are affixed to one another by suitable fastening means, for example, by welding. Each plate 381, 382 has a plurality of holes 381a, 382a (only hole 381a is seen in FIG. 5). The number of holes correspond to the number of balls 377 and facing holes are aligned with one another when both plates 381, 382 are affixed together.

A seat element 39 is formed in each hole 381a, 382a and axially extends along the edge of holes 381a, 382a to rotatably hold balls 377 on plates 381, 382. Plates 381 and 382 have major surfaces which are parallel to the end surfaces of end plate 271 and annular projection 112, seal elements 39 extend outwardly from these surfaces. Seat elements 39 only partially contact the outer surface of ball 377 so that a large portion of the outer surface of ball 377 extends from seat element 39. The outer surface of ball 377 therefore can contact the edge of pockets 372a, 375a and have rolling contact therewith. Thus, while the balls are firmly held within retainer 38 by the partially overlapping seat elements 39 so that they can all be carried at once by the retainer to facilitate assembly, the balls are freely rotatable and can contact the edges of pockets 372a and 375a. In the embodiment shown in FIGS. 4 and 5, seat element 39 is formed separate from annular plate 381, 382 and fixed in holes 381a, 382a of annular plate 381, 382. Alternatively, seat element 39 could be formed integral with annular plate 381, 382.

During the operation of the scroll type compressor, the balls are placed between the edge of facing pockets 372a, 375a and roll along the edge of pockets. Thus, rotating motion of orbiting scroll 27 is prevented while its angular relationship with fixed scroll 26 is maintained. As mentioned in the background of the invention, at any given position of orbital motion, all of the balls do not function to prevent rotation by being retained between the edges of facing pockets. However, retainer 38 holds the balls and thereby prevents noise which would be caused by the unrestricted movement of the balls within the pockets, and improves the durability of the rotation preventing/thrust bearing device. Also, during the operation of the scroll type compressor, each ball is in contact with the axial end surface of fixed race 371 and orbital race 374 to carry the thrust load from orbiting scroll 27.

As mentioned above, all the balls of the rotation preventing/thrust bearing device are held on the retainer and permitted rolling contact with the edge of the pockets and the race. Assembly of the rotation preventing/thrust bearing device and control of its parts is easily accomplished since all the balls are held by the retainer.

Figure 6:
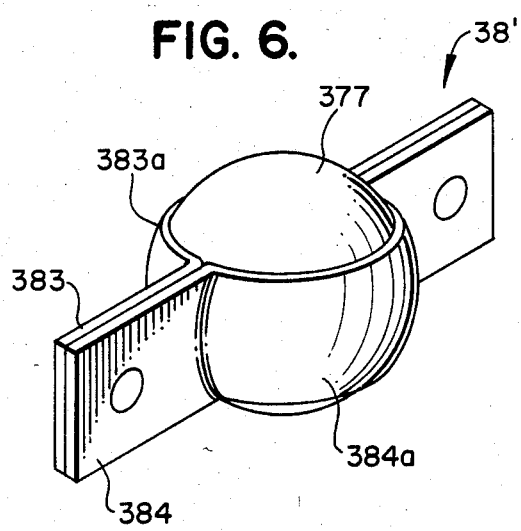
FIG. 6 is a perspective view of another embodiment of a ball retainer.

Referring to FIG. 6 the construction of a modified retainer is illustrated. Retainer 38' comprises two annular plates 383 and 384. A plurality of ball retaining portions 383*a*, 384*a* are formed in annular plates 383, 384. The curved surface of the retaining portions correspond to the outer curved surface of the ball to permit the rolling motion of the ball within retaining portions 383*a* and 384*a*. Retaining portions 383*a* and 384*a*, similar to seat elements 39, extend over a sufficient portion of balls 377 to hold them within retainer 38', while leaving the balls freely rotatable and with sufficient surface area exposed to contact the edges of the forcing pockets within which the balls are received.

This invention has been described in detail in connection with a preferred embodiment. This embodiment, however, is merely for example only and the invention is not restricted thereto. It will be easily understood by those skilled in the art that other variations and modifications can easily be made within the scope of this invention, as defined by the appended claims.

I claim:

1. In a scroll type fluid displacement apparatus including a housing, a fixed scroll fixedly disposed within said housing and having an end plate from which a first wrap extends, an orbiting scroll having an end plate from which a second wrap extends, said first and second wraps interfitting at an angular and radial offset to form a plurality of line contacts to define at least one pair of sealed of fluid pockets, driving means operatively connected to said orbiting scroll to effect the orbital motion of said orbiting scroll and rotation preventing/thrust bearing means for preventing the rotation of said orbiting scroll during orbital motion to thereby change the volume of the fluid pockets, the improvement comprising:

said rotation preventing/thrust bearing means including a fixed ring attached to an inner surface of said housing, an orbital ring attached to an axial end surface of said end plate of said orbiting scroll and a plurality of balls, said fixed and orbital rings having a plurality of facing pockets within which said balls are disposed, each of said facing pockets having a base and a circumferential edge spaced from said base, said balls having an outer surface with a first area for contacting both said base of said pockets to carry axial thrust load and said circumferential edge of said pockets to prevent rotation of said orbiting scroll and a second area, and retainer means for rotatably holding said balls, said retainer means including a plurality of ball receiving elements connected to one another, each of said ball receiving elements being spaced from said first area of the outer surface of said balls and extending over a sufficient amount of said second area of the outer surface of said balls to hold said balls in said retaining means while leaving a sufficient amount of said outer surface of said balls uncovered so that said balls rollingly contact said circumferential edges of the pockets within which they are received.

2. The scroll type fluid displacement apparatus of claim 1 wherein said retainer means comprises a pair of annular plates which are affixed to one another, said plates having a plurality of holes and one of said ball receiving elements being formed in each of said holes.

3. The scroll type fluid displacement apparatus of claim 1 wherein said retainer comprises a pair of annular plates each of which has a plurality of concave portions defining said ball receiving elements for holding said balls.

* * * * *